United States Patent [19]

Koput et al.

[11] 4,013,500
[45] Mar. 22, 1977

[54] APPARATUS FOR WRAPPING ELONGATED ARTICLES

[76] Inventors: James J. Koput, 13910 Forest Knoll Court, New Berlin, Wis. 53151; Elmer P. Knoll, c/o General Delivery, Wautoma, Wis. 54982

[22] Filed: Oct. 6, 1975

[21] Appl. No.: 619,913

[52] U.S. Cl. .............................. 156/425; 156/468; 242/7.19
[51] Int. Cl.² ...................................... B65H 81/00
[58] Field of Search .......... 156/195, 425, 428–432, 156/468, 443; 242/7.19–7.23

[56] References Cited

UNITED STATES PATENTS

| | | | |
|---|---|---|---|
| 1,278,043 | 9/1918 | Simpson | 242/7.19 |
| 1,795,876 | 3/1931 | McCoy | 156/431 X |
| 1,814,464 | 7/1931 | Baltzley | 242/7.19 |
| 2,093,206 | 9/1937 | Muller | 156/432 X |
| 3,328,224 | 6/1967 | Kennedy | 156/432 X |
| 3,616,061 | 10/1971 | Carter | 156/431 |
| 3,932,254 | 1/1976 | Comte | 156/431 X |

FOREIGN PATENTS OR APPLICATIONS 194,375  6/1907  Germany .......................... 242/7.22

*Primary Examiner*—David A. Simmons
*Attorney, Agent, or Firm*—James L. Kirschnik

[57] ABSTRACT

A machine for wrapping elongated articles with tape and/or warp material comprises a rotatably mounted hollow spindle having a concave conical end plate. The spindle is driven rotatably and has a rotatably mounted spool of thread or warp material and a rotatably mounted roll of tape mounted thereon which may be fed through an opening in the face plate for wrapping the article such as a flower stem. A hollow housing is provided for enclosing the majority of the spindle and the rolls of material as well as the driving connection to the spindle. The spindle is adapted to receive the articles to be wrapped which are then axially advanced as the tape and/or warp material is wrapped by rotating the spindle. A guide rod is provided for guiding the article to be wrapped and which is axially advanced as the spindle is driven.

17 Claims, 8 Drawing Figures

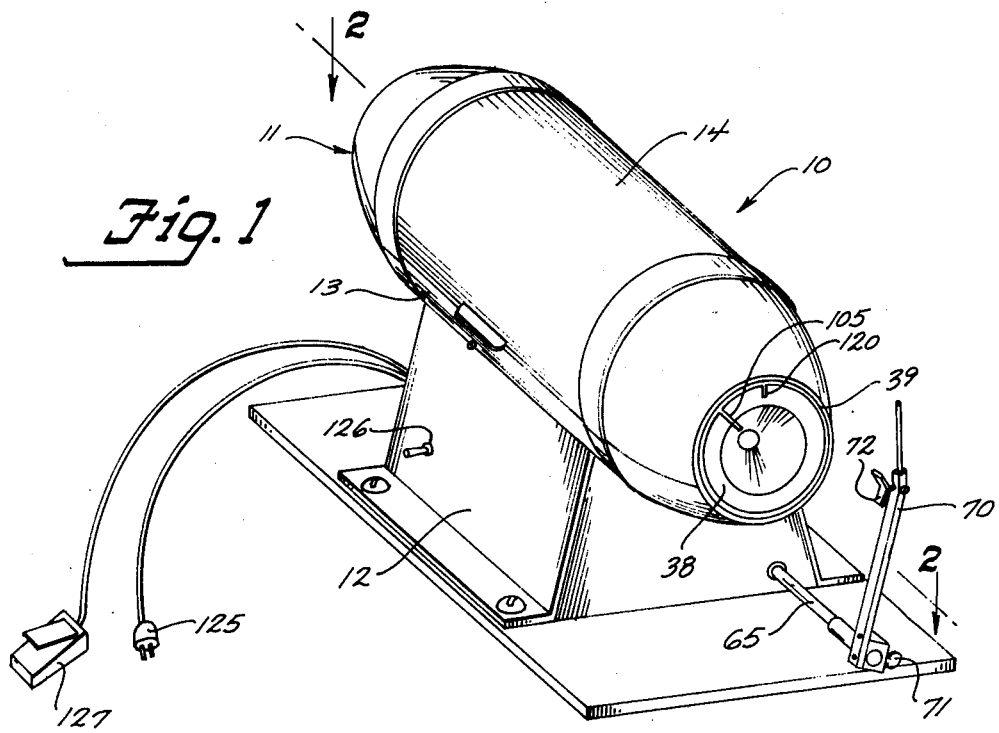
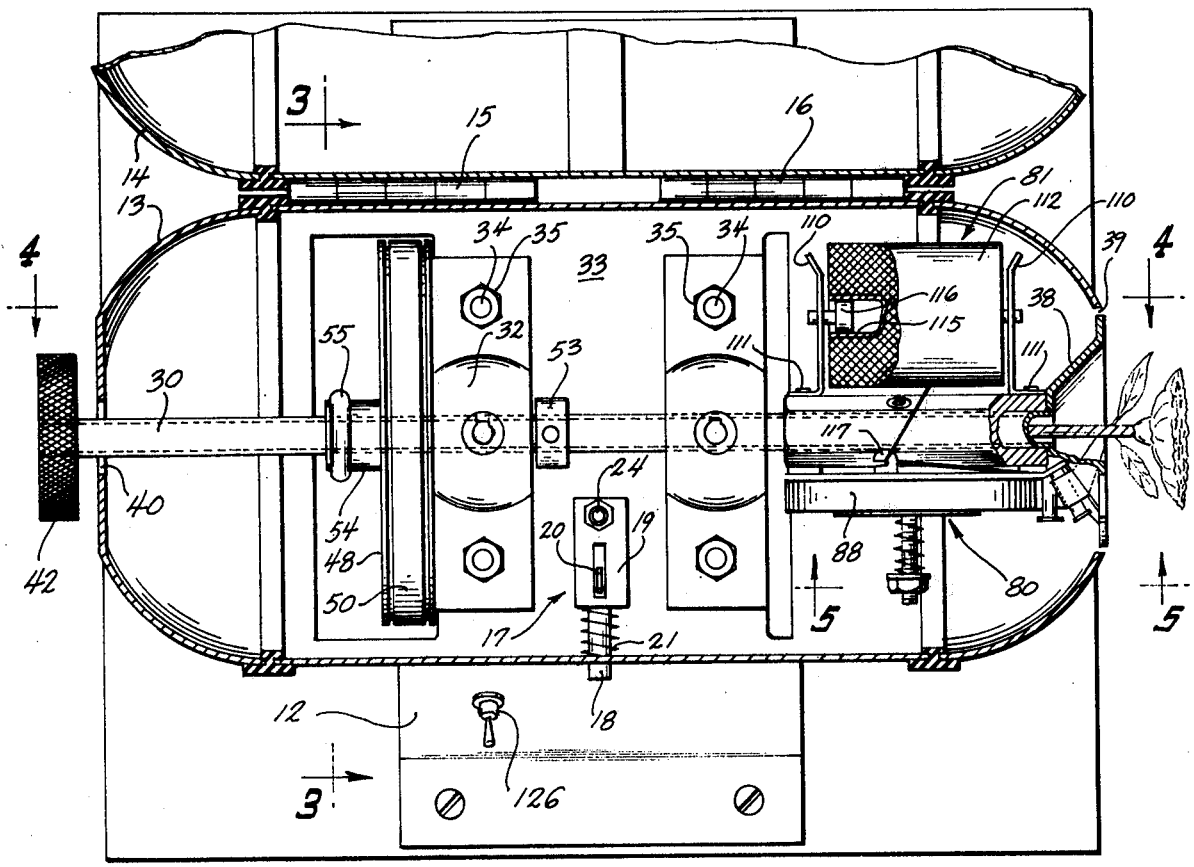

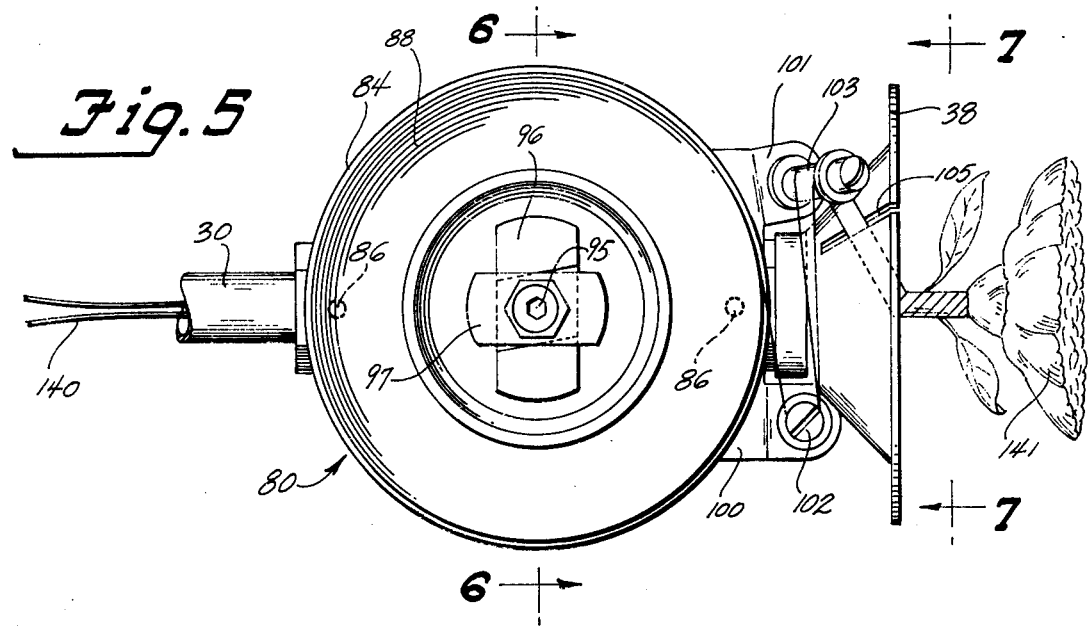
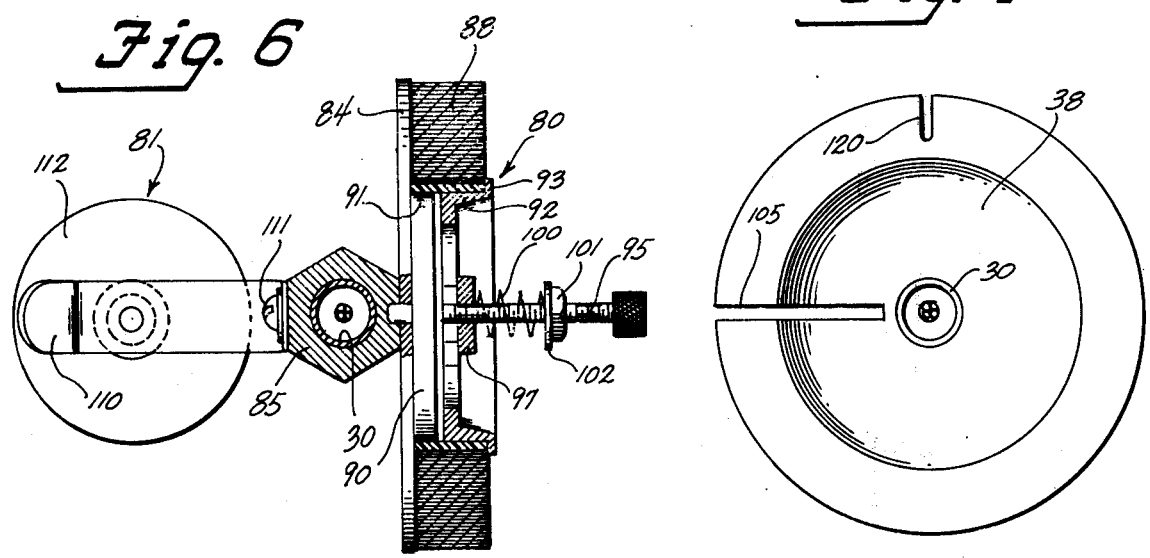
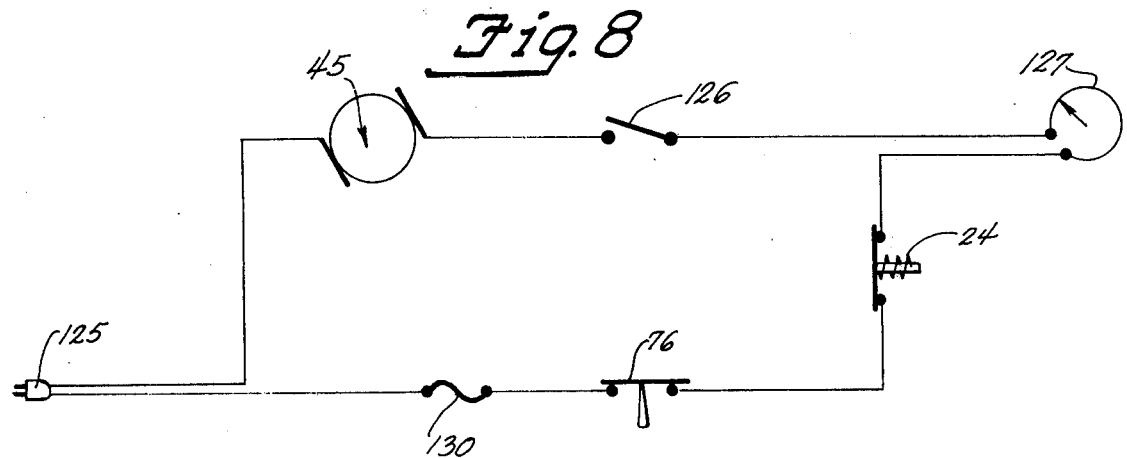

APPARATUS FOR WRAPPING ELONGATED ARTICLES

BACKGROUND OF THE INVENTION

This invention relates to machines for wrapping elongated articles with tape and/or warp material and is particularly suited to wrapping articles such as real or artificial flower stems. In the floral industry, it is often desirable to wrap the stems of flowers with tape and assemble a number or individual components such as blossoms, buds, leaves, etc. around a wire core. In the case of real flowers, such wrapping may serve to strengthen the relatively fragile stem portion of the flower which may then be incorporated into suitable floral arrangements such as corsages or bouquets. Similarly, in the case of artificial flowers, leaves or a number of flowers may be joined together by wrapping their stems with tape. A warp or thread material may also be used for providing strength to the wrapping and other decorative effects. Floral arrangements such as wreaths, canole rings, garlands or leis may be formed by continuously joining a chain of flowers together by wrapping their stems to a continuous wire core with the flowers or leaves being axially displaced relative to one another. In the past, such winding of floral arrangements has been primarily accomplished by hand since a suitable apparatus for wrapping has not been available.

SUMMARY OF THE INVENTION

It is an object of the invention to provide a machine for wrapping elongated articles such as flower and leaf stems with tape and/or a warp material.

A further object of the invention is to provide an apparatus for wrapping elongated articles which is simple in construction and easily transported.

Other objects and advantages of the present invention will become apparent from a description of the preferred embodiment which follows.

The invention basically comprises a machine for wrapping elongated articles with tape and/or warp material which includes a hollow rotatable spindle having a face plate attached thereto. A roll of tape and a roll of warp material may be mounted on the spindle adjacent the face plate for feeding tape and/or warp material through an opening in the face plate onto the article to be wrapped. A guide rod may be provided for axially advancing the article away from the face plate as the spindle rotates. A housing may be provided for enclosing the components of the machine for safer operation.

DESCRIPTION OF THE DRAWINGS

FIG. 1 is a perspective view of a machine constructed according to the invention;

FIG. 2 is a view taken along line 2—2 of FIG. 1;

FIG. 5 is a view taken along line 5—5 of FIG. 2;

FIG. 6 is a view taken along line 6—6 of FIG. 5;

FIG. 7 is a view taken along line 7—7 of FIG. 5; and

FIG. 8 is a schematic wiring diagram of the present invention.

DESCRIPTION OF THE PREFERRED EMBODIMENT

Figure 3:
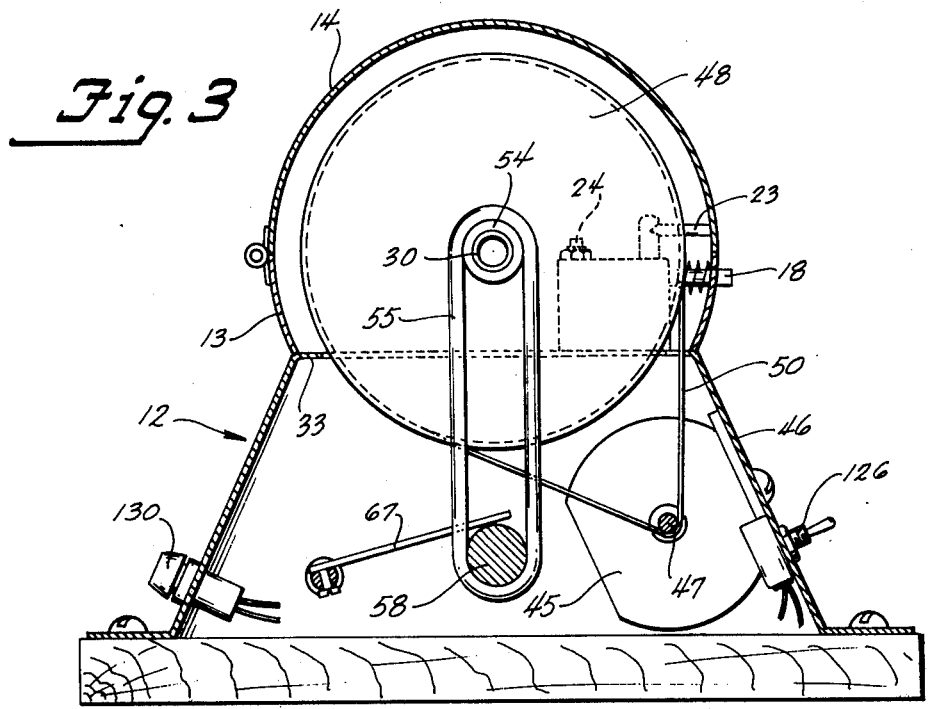
FIG. 3 is a view taken along line 3—3 of FIG. 2.

Referring to FIGS. 1–4, a winding apparatus 10 according to the invention comprises a housing 11 having a base 12. The housing 10 is hollow and may be of a generally cylindrical shape and is divided into a lower portion 13 attached to base 12 and an upper portion 14 which is attached to lower portion 13 by hinges 15 and 16 located along one edge of the junction between the two housings. A latch assembly 17 may be provided on the edge junction opposite the hinges 15 and 16 for locking the upper half 14 of housing 10 in place in the lower half 13. Latch assembly 17 may comprise a conventional release button 18 extending through the wall of lower housing 13 and which extends into a bracket 19 containing a pivotable catch 20 which may be moved by button 18 to release the latch 17. A spring 21 may be provided to bias the button 18 outwardly and for biasing the catch 20 into an engagement with a suitable latch plate 23 attached to the upper housing half 14. A safety switch 24 may be provided on latch bracket 19 as will be described hereinafter.

As shown in FIGS. 1–4, a hollow spindle 30 is provided for receiving the ends of elongated articles to be wrapped. Spindle 30 is rotatably supported within the housing 11 in suitable bearings 32 which are attached to a mounting plate 33 by screws 34 and nuts 35. One end of spindle 30 has a radially extending face plate 38 attached thereto which rotates with spindle 30 within an aperture 39 formed in one end of housing 11. The opposite end of spindle 30 extends through an aperture 40 formed in the opposite end of housing 11 and a knurled knob 42 may be attached to the extension of spindle 30 for permitting the spindle 30 to be rotated by hand.

Figure 4:
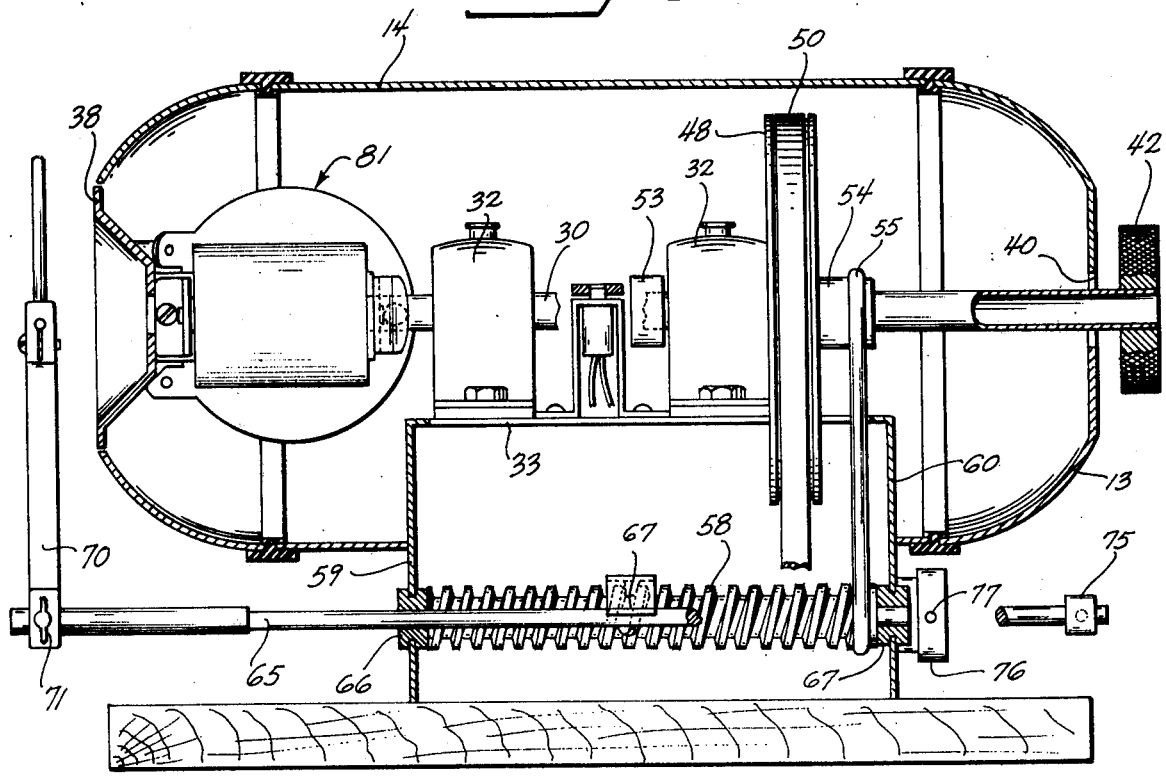
FIG. 4 is a view taken along line 4—4 of FIG. 2.

Referring now to FIGS. 2–4, the drive system for rotatably driving spindle 30 will be described. A prime mover or electric motor 45 may be mounted to a side wall 46 of base 12. The output shaft 47 of motor 45 drives a pulley 48 attached to spindle 30 through a drive belt 50. Pulley 48 may have one side positioned adjacent one of the spindle bearings 32, and a collar 53 may be attached to spindle 30 on the opposite side of the bearing 32 as seen in FIG. 2 for limiting axial motion of the spindle 30. A second boss or hub 54 may be provided on the opposite side of pulley 48. Hub 54 drives a second belt 55 which in turn drives a helically threaded screw shaft 58 mounted within the base 12. The screw shaft 58 extends generally parallel to the axis of spindle 30 and is rotatably journaled in suitable bearings (not shown) attached to end walls 59 and 60 of base 12. Also extending parallel to screw shaft 58 within base 12, is a guide rod 65. Rod 65 is slidably supported in bearings 66 in each end wall 59 and 60 and is of sufficient length to extend outwardly from the end walls. A lever or follower 67 is affixed to guide rod 65 within the base 12 and is engageable with the threads of screw 58 so that as the screw rotates, the follower 67 will advance guide rod 65 axially within bearings 66. The end of guide rod 65 which protrudes from the face plate end of housing 11 has a radially extending guide arm 70 attached thereto. Guide arm 70 may have an aperture formed in one end for receiving the end of guide rod 65, and a locking screw 71 may be provided for frictionally fixing the angular and longitudinal position of arm 70 on rod 65. A guide bracket 72 may be affixed to guide arm 70 at a radius which generally intersects the axis of spindle 30 for placement adjacent the articles to be wrapped. At the opposite end of guide rod 65, a radially protruding knob or cam 75 may be provided which is positioned outside the rear wall 60 of base 12. A suitable limit switch 76 may also be mounted on wall 60 and has a follower 77 which is engaged by cam 75 when guide rod 65 is axially advanced to place cam 75 adjacent wall 60. Switch 76 may be provided to automatically turn off motor 45 as will be described hereinafter.

Referring now to FIGS. 2, 5, 6 and 7, the apparatus 10 is provided with a tape dispenser assembly 80 and a warp dispenser assembly 81 both of which are attached to spindle 30 within the housing 11. Tape dispenser 80 includes a base plate 84 attached to a mounting collar 85 affixed to spindle 30 adjacent the back side of face plate 38. Any suitable attaching means such as screws 86 may be provided. Base plate 84 extends generally parallel to the axis of spindle 30 and may support a roll of wrapping tape 88. The tape roll 88 is rotatably mounted on base plate 84 between a first, generally cylindrical retainer 90 which extends into a central aperture 91 of tape roll 88, and a second generally cylindrical retainer 92. The first retainer 90 may be affixed to base plate 84 while the second retainer 92 is removable and has a radial flange 93 for bearing against the side of roll 88 to retain the roll against axial motion. The first retainer has a central, threaded shaft 95 extending transversely therefrom and which passes through a generally rectangular aperture 96 formed in the center of the second retainer 92. A generally rectangular retainer plate 97 is also passed over shaft 95 and has a shape similar to but slightly reduced from aperture 96. It will thus be appreciated that when plate 97 is positioned with its long side perpendicular to aperture 96, as shown in FIG. 5, it will bear against retainer 92, and when rotated 90° into alignment with aperture 96, retainer 92 may be removed. A compression type retainer spring 100 is also provided on shaft 95 adjacent plate 97 and is retained by a nut 101 and washer 102. As nut 101 is advanced down threaded shaft 95, the spring 100 will be compressed thereby increasing the spring pressure against plate 97 and retainer 92 which then bears against tape roll 88 thereby increasing the drag or force necessary to rotate the tape roll 88. Retainers 90 and 92 are dimensioned such that a small space remains between them when a tape roll 88 is in position to accomodate the friction adjustment.

As shown in FIGS. 2 and 5, the base plate 84 has a pair of spaced ears 100 and 101 adjacent the rear of face plate 38. A first guide roller 102 is rotatably affixed to ear 100 with its axis of rotation essentially parallel to that of tape roll 88, and a second guide roller 103 is rotatably affixed to ear 101 with its axis of rotation angularly oriented to direct the tape into a helical path. The tape from roll 88 passes around roller 102 and up and over roller 103 as shown in FIG. 5. As shown in FIGS. 5 and 7, the tape passes downwardly off roller 103 and out a radial slot 105 formed in face plate 38 so that the tape may engage the articles to be wrapped. Radial slot 105 is angularly advanced from roller 103 in the direction of spindle rotation so as to further stretch the tape and apply pressure from the outside of the article to assure a tightly wrapped assembly.

As is shown in FIGS. 2, 4 and 6 the warp dispenser assembly 81 comprises a pair of spaced, radially extending leaf springs 110 attached to mounting collar 85 opposite the tape dispenser 80. Leaf springs 110 may be attached to collar 85 by means such as screws 111. The leaf springs 110 are adapted to receive a roll of string or warp material 112 having its axis of rotation generally parallel to the axis of spindle 30. The warp roll 112 may be wound on a hollow core or tube 115 which rotatably engages a button 116 extending from the inner face of each leaf spring 110 for permitting rotation of warp roll 112. The warp material may pass from warp roll 112 through a guide 117 affixed to base plate 84, and may then pass out slot 105 with the tape for engagement with the articles. Alternatively, a small groove 120 may be formed in the outer edge of face plate 38 through which the warp may pass. The use of leaf springs applies friction to the ends of the warp spool core, preventing coasting of the spool and providing the tension on the warp needed to assure a tightly wrapped assembly.

Referring now to FIG. 8, a schematic wiring diagram of the control system is shown. Motor 45 may be coupled to a suitable power source by a conventional plug 125. In series with the motor 45, a master on-off switch 126, a cover interlock switch 24, and a guide rod limit switch 76 may be provided. Additionally, a suitable rheostat 127 may be provided for varying the speed of motor 45. Rheostat 127 and master switch 126 are generally shown in FIG. 1. Finally, a fuse 130 may be provided to protect the circuit.

OPERATION

With reference to all the figures generally, the operation of the preferred embodiment will now be described. Initially it will be assumed that an elongated flower and leave stems 140, as shown in FIGS. 2 and 5, are to be wrapped with both tape and warp material. A roll of warp 112 and tape 88 will be placed on the warp dispenser 81 and tape dispenser 80 respectively and the warp and tape guided through slot 105 in face plate 38. Upper housing 14 is then closed and locked by latch assembly 17 and cover switch 24 is closed. The apparatus 10 is connected to a suitable power source by plug 125. Guide rod 65 is rotated by gripping guide arm 70 to disengage follower 67 from screw 58 and the guide rod 65 slid back to position the guide arm 70 adjacent to the face plate 38. The guide rod 65 may then be rotated to engage the follower 67 with screw 58. At this position the guide arm 70 can be adjusted to accomodate the articles being wrapped. Master control switch 126 is then turned on and the machine is ready to operate.

The article to be wrapped, in this example, flower stem and leaf stems 140, is inserted within spindle 30 and the tape and warp material held in contact with the stems. Alternatively it is possible to insert a wire core from the back end of spindle if desired. Hand knob 42 may be turned to rotate spindle 30 and face plate 38 to initially wrap the tape and warp material around the stems 140. Note that the concave shape of face plate 38 permits the head 141 of the flower to be positioned for receiving the initial wrap if desired. Guide bracket 72 may be held against the flower. Upon actuation of the rheostat 127, the motor 45 will rotate spindle 30 and the face plate 38. As the spindle 30 rotates around the flower stem, which is not rotated, the tape and warp material will be wound around the stem. Simultaneously, screw 58 is also rotatably driven whereby follower 67 advances guide rod 65 axially. If the flower is held adjacent to guide bracket 72, the flower stem will also advance axially while being wrapped and a uniform helical wrap of warp and tape will be applied to the stem. As the guide rod 65 advances to the end of its travel, cam 75 will contact the travel switch 76 and turn the motor 45 off. The machine may also be turned off through rheostat 127. Additionally the speed of rotation of spindle 30 is controlled by rheostat 127, however, a corresponding speed change of screw 58 results so that a coordinated axial advance of guide rod 65 is maintained.

Depending on the strength of the article to be wrapped and the amount of tension needed to satisfactorily pre-stretch the wrapping tape, the wrapping tension on the tape may be varied. This is accomplished by adjusting the compression of spring 100 of the tape dispenser assembly 80 by turning nut 101. As the spring 100 is compressed, retainer plate 97 presses on retainer 92 which increases the friction between the retainers 90 and 92 and tape roll 88 whereby the tension necessary to unwind the tape is increased. The tape guide rollers 102 and 103 also provide a degree of winding tension. The concept utilized for this purpose tensions the tape roll independently of the core diameter which has been found to vary widely in size and frictional coefficient in products now on the market.

It will be apparent that the machine may be used to wrap articles with tape alone or warp alone in the manner just described. If warp material alone is desired, then the warp is preferably fed through the second notch 120 in face plate 38. The machine may also be used to wrap continuous or very long articles. Since the spindle 30 is hollow throughout its entire length, such long articles may extend outwardly from the rear end of spindle 30 or be fed into the rear end as from a coil of material for example. Short segments or individual components may be added individually to a continuous core at regular spacings by adjusting the longitudinal position of guide rod bracket 70 to shut off the machine at regular intervals of the length desired.

The design of the machine affords maximum safety to the operator by confining all working parts within an enclosure. Access to the enclosure is gained by opening the cover, which causes a switch to open and cut off power to the drive motor. The face plate is so designed to eliminate any pinch points. The tape holder design utilizes a quick release mechanism to allow easy loading and unloading of the rolled tape without cumbersome threaded fasteners or other costly, time consuming techniques to retain the roll of tape. The holder for the warp spool is similarly designed to afford unencumbered access and permit easy, rapid loading and unloading.

While the present invention has been described for wrapping flowers, it is suitable for wrapping other elongated articles as well. Similarly other variations will be apparent to those skilled in the art. Accordingly the scope of the invention is not to be limited by the foregoing description but is to be taken solely from an interpretation of the claims which follow.

We claim:

1. Apparatus for wrapping elongate articles with a flexible material, said apparatus comprising:
   a base;
   hollow spindle means rotatably mounted on said base and having an open front end for receiving articles to be wrapped;
   a face plate mounted on the front end of said spindle means extending generally radially from the axis of rotation of said spindle means having a central aperture aligned with the opening in said spindle means, said face plate being generally conical and having a concave front surface and further including at least a first radially extending slot formed therein through which said flexible material passes, said slot extending to the peripheral edge of said face plate;
   dispenser means attached to said spindle adjacent the back of said face plate for feeding said flexible material through said first slot onto the article to be wrapped;
   roller means disposed between said dispenser means and the back of said face plate for guiding said flexible material to said slot, said slot being angularly advanced from said roller means in the direction of rotation of said spindle means; and
   means for rotatably driving said spindle means.

2. Apparatus as defined in claim 1 including:
   housing means for enclosing said dispenser means and a major portion of said spindle means, said housing means being openable to expose said dispenser means for loading and unloading of said flexible material.

3. Apparatus as defined in claim 2 including:
   feed rod means extending generally parallel to the axis of rotation of said spindle means and having a radially extending guide means for selectively engaging the article to be wrapped; and
   feed means for axially advancing said feed rod means as said spindle rotates to apply said flexible material to said elongate article in a generally helical configuration.

4. Apparatus as defined in claim 3 including means for disengaging said drive means after a preselected length of axial travel of said feed rod means.

5. Apparatus as defined in claim 3 wherein:
   said dispenser means comprises means for rotatably supporting a roll of said flexible material about an axis of rotation extending generally transverse to the axis of rotation of said hollow spindle means.

6. Apparatus as defined in claim 5 including:
   means for selectively increasing the friction between said roll of flexible material and said support means to increase the tension on said flexible material during wrapping.

7. Apparatus as defined in claim 6 wherein:
   said flexible material is a tape.

8. Apparatus as defined in claim 3 wherein:
   said dispenser means comprises first means for rotatably supporting a roll of tape and second means for rotatably supporting a roll of warp material.

9. Apparatus as defined in claim 8 wherein:
   the axis of rotation of said tape roll is generally transverse to the axis of rotation of said spindle means;
   the axis of rotation of said warp roll is generally parallel to the axis of rotation of said spindle means; and
   guide means for guiding said tape and warp material to said first opening in said face plate.

10. Apparatus as defined in claim 9 including:
    control means for selectively varying the speed of rotation of said drive means.

11. Apparatus as defined in claim 1 including:
    feed rod means extending generally parallel to the axis of rotation of said spindle means and having a radially extending guide means for selectively engaging the article to be wrapped; and
    feed means for axially advancing said feed rod means as said spindle rotates to apply said flexible material to said elongate article in a generally helical configuration.

12. Apparatus as defined in claim 11 including means for disengaging said drive means after a preselected length of axial travel of said feed rod means.

13. Apparatus as defined in claim 12 wherein:
said dispenser means comprises means for rotatably supporting a roll of said flexible material about an axis of rotation extending generally transverse to the axis of rotation of said hollow spindle means.

14. Apparatus as defined in claim 13 including:
means for selectively increasing the friction between said roll of flexible material and said support means to increase the tension on said flexible material during wrapping.

15. Apparatus as defined in claim 1 wherein:
said dispenser means comprises first means for rotatably supporting a roll of tape and second means for rotatably supporting a roll of warp material.

16. Apparatus as defined in claim 15 wherein:
the axis of rotation of said tape roll is generally transverse to the axis of rotation of said spindle means;
the axis of rotation of said warp roll is generally parallel to the axis of rotation of said spindle means; and
guide means for guiding said tape and warp material to said first opening in said face plate.

17. Apparatus as defined in claim 16 including:
control means for selectively varying the speed of rotation of said drive means.

* * * * *